US012811351B2

(12) United States Patent
Ishiura et al.

(10) Patent No.: US 12,811,351 B2
(45) Date of Patent: Nov. 24, 2026

(54) CONNECTOR INCLUDING AN INTERLOCK TERMINAL

(71) Applicants: TOYOTA JIDOSHA KABUSHIKI KAISHA, Toyota (JP); SUMITOMO WIRING SYSTEMS, LTD., Yokkaichi (JP)

(72) Inventors: Kazuaki Ishiura, Okazaki (JP); Masaya Murata, Toyota (JP); Yuki Wada, Yokkaichi (JP); Keiichi Yoshida, Yokkaichi (JP)

(73) Assignees: TOYOTA JIDOSHA KABUSHIKI KAISHA, Toyota (JP); SUMITOMO WIRING SYSTEMS, LTD., Mie (JP)

( * ) Notice: Subject to any disclaimer, the term of this patent is extended or adjusted under 35 U.S.C. 154(b) by 297 days.

(21) Appl. No.: 18/400,424

(22) Filed: Dec. 29, 2023

(65) Prior Publication Data

US 2024/0275109 A1 Aug. 15, 2024

(30) Foreign Application Priority Data

Feb. 9, 2023 (JP) ................................ 2023-018429

(51) Int. Cl.
*H01R 24/28* (2011.01)
*H01R 13/207* (2006.01)
(Continued)

(52) U.S. Cl.
CPC ........... *H01R 24/28* (2013.01); *H01R 13/207* (2013.01); *H01R 13/6215* (2013.01);
(Continued)

(58) Field of Classification Search
CPC .. H01R 24/28; H01R 13/207; H01R 13/6215; H01R 13/645; H01R 24/60;
(Continued)

(56) References Cited

U.S. PATENT DOCUMENTS

D561,700 S * 2/2008 Gorman ........................ D13/154
7,357,652 B1 * 4/2008 Arenas ................... H01R 24/78 439/107
(Continued)

FOREIGN PATENT DOCUMENTS

JP 2020-072065 A 5/2020
JP 2022-098552 A 7/2022

*Primary Examiner* — Edwin A. Leon
(74) *Attorney, Agent, or Firm* — Oliff PLC

(57) ABSTRACT

A connector disclosed in the present specification includes a connector body including an opening, two power terminals each including a through hole, and an interlock terminal. The two power terminals and the interlock terminal are disposed within the opening. Two tabs are provided on a side surface of the connector body, and each include a hole. In a plan view of the opening, the two power terminals and the interlock terminal are disposed such that a triangle connecting a center of the interlock terminal and centers of the through holes of the two power terminals is an isosceles triangle. The center of the interlock terminal corresponds to a vertex angle of the isosceles triangle. The two tabs are disposed in diagonal areas among four areas divided by a bisector of the vertex angle of the isosceles triangle and a straight line extended from a base of the isosceles triangle.

5 Claims, 3 Drawing Sheets

(51) Int. Cl.
*H01R 13/621* (2006.01)
*H01R 13/645* (2006.01)
*H01R 24/60* (2011.01)
*H01R 103/00* (2006.01)

(52) U.S. Cl.
CPC ........... *H01R 13/645* (2013.01); *H01R 24/60* (2013.01); *H01R 2103/00* (2013.01)

(58) Field of Classification Search
CPC ...... H01R 2103/00; H01R 11/12; H01R 4/34; H01R 13/02; H01R 13/40; H01R 13/73
See application file for complete search history.

(56) References Cited

U.S. PATENT DOCUMENTS

| | | | | |
|---|---|---|---|---|
| 12,413,020 | B2 * | 9/2025 | Hsu | H01R 13/111 |
| 2003/0236011 | A1 * | 12/2003 | Gorman | H01R 13/652 439/107 |
| 2012/0285729 | A1 * | 11/2012 | Imahori | H01R 13/65912 174/152 R |
| 2020/0176916 | A1 | 6/2020 | Nakamura et al. | |

* cited by examiner

CONNECTOR INCLUDING AN INTERLOCK TERMINAL

CROSS-REFERENCE TO RELATED APPLICATION

This application claims priority to Japanese Patent Application No. 2023-018429 filed on Feb. 9, 2023, incorporated herein by reference in its entirety.

BACKGROUND

1. Technical Field

A technique disclosed in the present specification relates to a connector that includes two power terminals and an interlock terminal.

2. Description of Related Art

In addition to two power terminals that transmit electrical power, the connector may include an interlock terminal. In the connector disclosed in Japanese Unexamined Patent Application Publication No. 2022-98552 (JP 2022-98552 A), the two power terminals and the interlock terminal are arranged in a straight line. Additionally, two tabs are provided on a side surface of a connector body. A hole through which a bolt passes to fix the connector is provided on the tab.

SUMMARY

The present specification provides a connector that is more convenient to use than a conventional connector.

A connector disclosed in the present specification includes a connector body including an opening, two power terminals each including a through hole, and an interlock terminal. The two power terminals and the interlock terminal are disposed within the opening. Two tabs are provided on a side surface of the connector body, and each include a hole through which a bolt passes to fix the connector body. In a plan view of the opening, the two power terminals and the interlock terminal are disposed such that a triangle connecting a center of the interlock terminal and centers of the through holes of the two power terminals is an isosceles triangle. At this time, the center of the interlock terminal corresponds to a vertex angle of the isosceles triangle. In other words, a line segment connecting the centers of the two through holes corresponds to the base of the isosceles triangle. The two tabs are disposed in diagonal areas among four areas divided by a bisector of the vertex angle of the isosceles triangle and a straight line extended from a base of the isosceles triangle.

According to the above characteristics, the connector disclosed in the present specification can make the opening compact to which three terminals are exposed. Further, by disposing the tabs as described above, the connector can be securely fixed to a housing of an electrical device.

Details of the technique disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
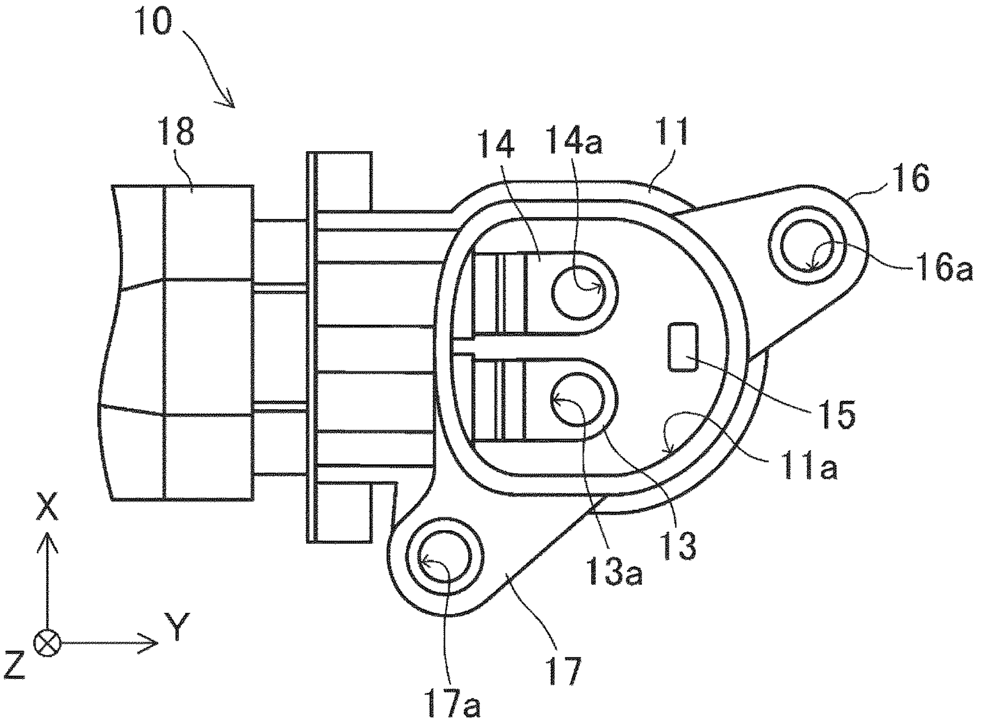
FIG. 1A is a plan view of a connector of an embodiment.
Figure 1B:
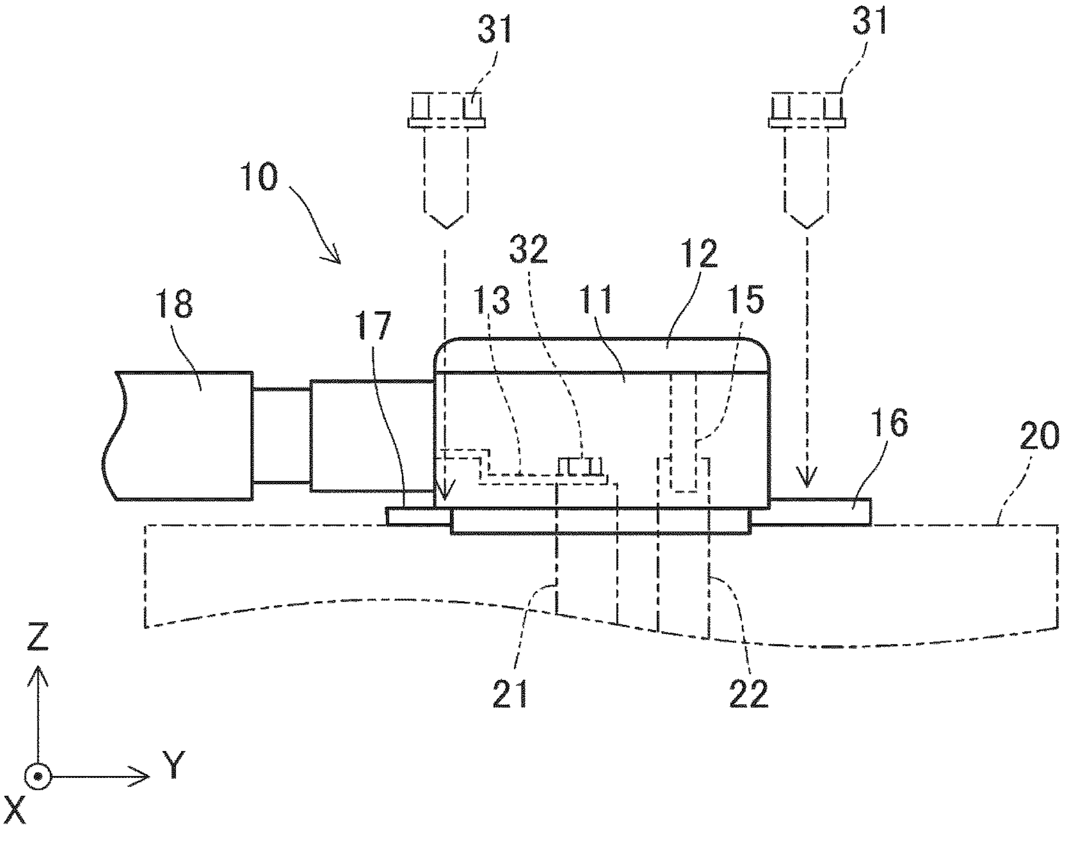
FIG. 1B is a side view of the connector.

A connector 10 of an embodiment will be described with reference to the drawings. FIG. 1A shows a plan view of the connector 10, and FIG. 1B shows a side view of the connector 10. Here, the "plan view" corresponds to a plan view of an opening 11*a* included in a connector body 11. A Z direction of a coordinate system in the figure corresponds to a normal direction of the opening 11*a* of the connector body 11. Therefore, the "plan view of the connector" also corresponds to a view of the opening 11*a* viewed from its normal direction. In FIG. 1B, an electrical device 20 to which the connector 10 is attached is drawn with virtual lines.

The connector 10 includes the connector body 11 including the opening 11*a*, two power terminals 13, 14, and an interlock terminal 15. The power terminals 13, 14 are terminals for supplying electrical power to the electrical device 20. The connector 10 is connected to a cable 18, and the cable 18 is connected to a power source. The power terminals 13, 14 are connected to the cable 18 within the connector body 11. When the power source is a direct current (DC) power source, one of the power terminals 13, 14 becomes a positive terminal, and the other becomes a negative terminal. When the power source is an alternating current (AC) power source, the power terminals 13, 14 have no polarity.

The power terminals 13, 14 and the interlock terminal 15 are exposed to the opening 11*a*. The power terminals 13, 14 are provided with through holes 13*a*, 14*a*, respectively, through which bolts pass. Therefore, strictly speaking, the power terminals 13, 14 are disposed within the connector body 11 such that the through holes 13*a*, 14*a* of the power terminals 13, 14 are exposed from the opening 11*a*. Further, the interlock terminal 15 is disposed within the connector body 11 such that a distal end of the interlock terminal 15 is exposed from the opening 11*a*.

The connector 10 is attached to the electrical device 20. At this time, the power terminals 13, 14 of the connector 10 are connected to a power terminal 21 of the electrical device 20 with bolts 32. The bolt 32 passes through the through hole 13*a* (14*a*) and is fixed to the power terminal 21. Note that by removing a cover 12 attached to a back surface of the connector body 11, the bolt 32 can be inserted into the connector body 11.

The interlock terminal 15 has a function of disabling activation of another device that operates with electrical power from the power source while the connector 10 is disconnected from the electrical device 20. The electrical device 20 is provided with an interlock receiving terminal 22 including a recessed portion at a distal end of the interlock receiving terminal 22. When the connector 10 is attached to the electrical device 20, the distal end of the interlock terminal 15 fits into the recessed portion of the interlock receiving terminal 22. Two inner surfaces of the recessed portion face each other. The inner surfaces each have a signal terminal. A metal plate is provided on a side surface of the distal end of the interlock terminal 15. When the interlock terminal 15 fits into the recessed portion of the interlock receiving terminal 22, the two signal terminals that face each other are electrically connected through the metal plate of the interlock terminal 15. The two signal terminals of the interlock receiving terminal 22 are connected to a relay (not shown). The relay disconnects the power source (not shown) from the electrical device and the like. When the two signal terminals of the interlock receiving terminal 22 are electrically connected, the relay is closed, and the electrical power is supplied to the electrical device. This interlock mechanism is an example. The interlock mechanism is well known, so a detailed description will be omitted.

Two tabs 16, 17 are provided on a side surface of the connector body 11. The tab 16 is provided with a hole 16*a*, and the tab 17 is provided with a hole 17*a*. The connector 10 is fixed to the electrical device 20 with bolts 31 that pass through the holes 16*a*, 17*a* of the tabs 16, 17 (see FIG. 1B). In other words, the tab 16 (17) is a protrusion that protrudes from the side surface of the connector body 11, and the hole 16*a* (17*a*) through which the bolt 31 passes is provided to the protrusion.

The disposition of the two power terminals 13, 14 and the interlock terminal 15 will be described. FIG. 2 again shows the plan view of the connector 10. Auxiliary lines L1, L2 are also drawn in FIG. 2. As mentioned above, the plan view shown in FIG. 2 (FIG. 1A) corresponds to the plan view of the opening 11*a* of the connector 10. In other words, FIGS. 1A and 2 correspond to views of the connector 10 viewed along the normal direction of the opening 11*a*.

Figure 2:
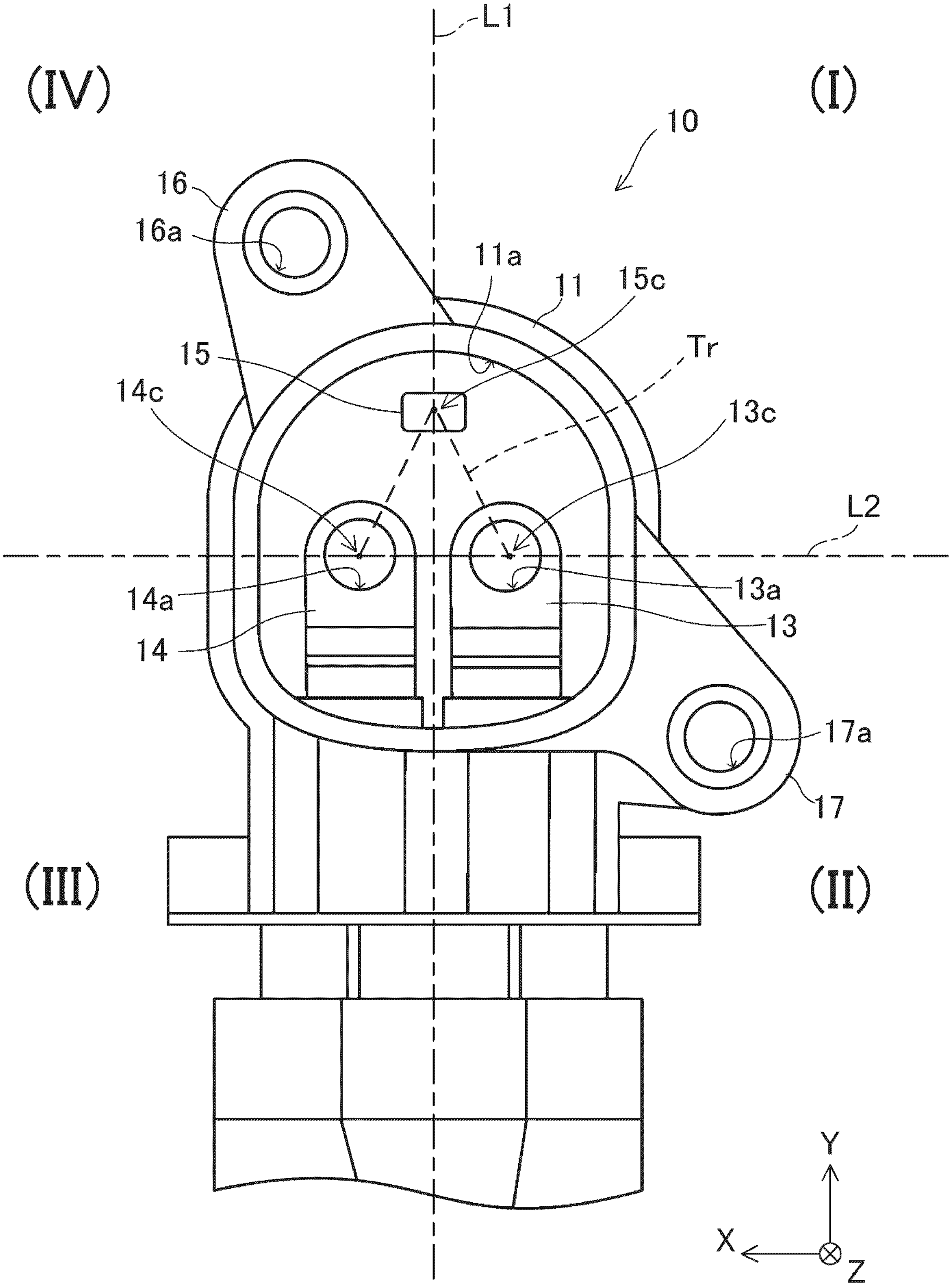
FIG. 2 is a plan view of the connector (with auxiliary lines added)

Centers 13*c*, 14*c* of the through holes 13*a*, 14*a* of the power terminals 13, 14 and a center 15*c* of the interlock terminal 15 form an isosceles triangle Tr. In FIG. 2, the isosceles triangle Tr is drawn with dashed lines. The center 15*c* means a center of the distal end of the interlock terminal 15, in a plan view of the interlock terminal 15. To paraphrase the disposition of the centers 13*c*, 14*c*, 15*c*, a shape formed by connecting the centers 13*c*, 14*c*, 15*c* is the isosceles triangle Tr, in the plan view of the opening 11*a*. At this time, the center 15*c* of the interlock terminal 15 corresponds to the apex of the vertex angle of the isosceles triangle. A line connecting the two centers 13*c*, 14*c* corresponds to the base of the isosceles triangle Tr. This disposition contributes to miniaturizing the connector 10.

Figure 3:
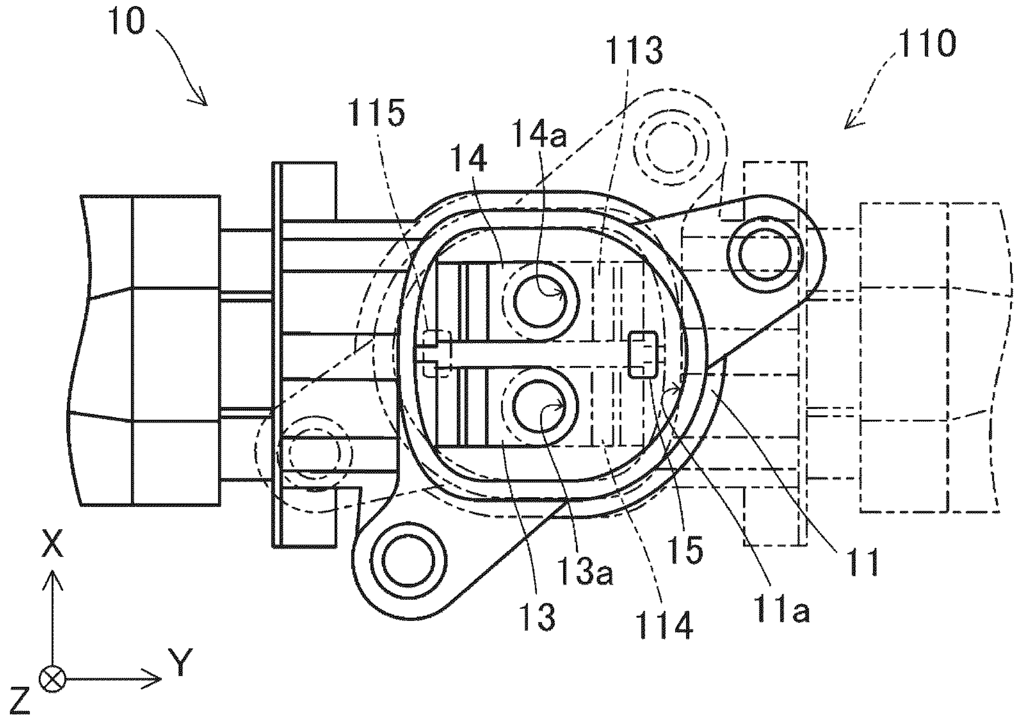
FIG. 3 is a superimposed view of the connector and another connector obtained by rotating the connector by 180 degrees.

Furthermore, the above disposition of the centers 13*c*, 14*c*, 15*c* also contributes to increase flexibility in the disposition of the terminals of the electrical device 20. FIG. 3 shows a front view in which another connector 110 obtained by rotating the connector 10 by 180 degrees around the normal line of the opening 11*a* is superimposed on the connector 10. FIG. 3 is a view in which through holes of power terminals 113, 114 of the connector 110 are super imposed on the through holes 13*a*, 14*a* of the power terminals 13, 14 of the connector 10. As shown in FIG. 3, the through holes of the power terminals 113, 114 of the connector 110 and an interlock terminal 115 are within the range of the opening 11*a* of the connector body 11. Even the disposition of the terminals (the power terminal 21 and the interlock receiving terminal 22) of the electrical device 20 is rotated by 180 degrees from the state shown in FIG. 1B, changes to the connector 10 can be minimal. That is, when the disposition of the terminals in the electrical device 20 is changed from the disposition corresponding to the connector 10 in FIG. 3 to the disposition corresponding to the connector 110, the shape of the connector 10 is changed less.

Returning to FIG. 2, another feature of the connector 10 will be described. As previously mentioned, the two tabs 16, 17 are extended from the side surface of the connector body 11. The disposition of the two tabs 16, 17 will be described. The auxiliary line L1 in FIG. 2 is the bisector of the vertex angle of the isosceles triangle Tr, and the auxiliary line L2 is the straight line that includes the base of the isosceles triangle Tr. In other words, the auxiliary line L1 is the perpendicular bisector of the base of the isosceles triangle Tr, and the auxiliary line L2 is a straight line extended from the base.

In the plan view of the opening 11*a* of the connector body 11, the auxiliary line L1 and the auxiliary line L2 intersect at right angles. That is, the plan view in FIG. 2 is divided into four areas (a first quadrant (I), a second quadrant (II), a third quadrant (III), and a fourth quadrant (IV)) by the auxiliary lines L1, L2. The two tabs 16, 17 are disposed in diagonal areas (in the case of FIG. 2, the second quadrant (II) and the fourth quadrant (IV)). The connector body 11 does not include the tabs in the remaining areas (in the case of FIG. 2, the first quadrant (I) and the third quadrant (III)). This disposition of the tabs contributes to securely fix the connector 10 to the electrical device 20 with fewer bolts.

As described above, the connector 10 of the embodiment is more convenient to use compared to a conventional connector.

Points to be noted regarding the technique described in the embodiment will be described. The centers 13*c*, 14*c* of the through holes 13*a*, 14*a* of the two power terminals 13, 14 and the center 15*c* of the interlock terminal 15 constitute the isosceles triangle (the center 15*c* corresponds to the vertex angle). More preferably, the centers 13*c*, 14*c*, 15*c* form an equilateral triangle. When the centers 13*c*, 14*c*, 15*c* form an equilateral triangle, the opening 11*a* can be circular. The feature that the centers 13*c*, 14*c*, 15*c* form an equilateral triangle contributes to making the connector 10 even more compact.

The tabs 16, 17 provided on the connector body 11 may be disposed in the first quadrant (I) and the third quadrant (III) in FIG. 2.

Although the specific examples have been described in detail above, these are merely examples and do not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A connector comprising:

a connector body that includes an opening;

two power terminals that are disposed within the opening, and each include a through hole;

an interlock terminal disposed within the opening, the interlock terminal being configured to electrically connect two signal terminals to each other in a state in which the connector is connected to an electrical device, and to electrically disconnect the two signal terminals from each other in a state in which the connector is disconnected from the electrical device; and two tabs that are provided on a side surface of the connector body, and each include a hole through which a first bolt passes to fix the connector body, wherein in a plan view of the opening, the two power terminals and the interlock terminal are disposed such that a triangle connecting a center of the interlock terminal and centers of the two through holes is an isosceles triangle with the center of the interlock terminal corresponding to an apex of a vertex angle, and the two tabs are disposed in diagonal areas among four areas divided by a bisector of the vertex angle of the isosceles triangle and a straight line extended from a base of the isosceles triangle.

2. The connector according to claim 1, wherein each power terminal of the two power terminals includes a through hole configured to receive a second bolt that attaches the respective one of the power terminals to an electrical device.

3. The connector according to claim 2, further comprising a removable cover attached to a back surface of the connector body, the removable cover allowing insertion of the second bolts through the through holes of the power terminals only in a removed state of the cover.

4. The connector according to claim 2, wherein the through holes of the power terminals are arranged such that the second bolts pass through the through holes in a same direction that the first bolts pass through the holes of the two tabs.

5. The connector according to claim 1, wherein the interlock terminal includes a conductive portion configured to connect the two signal terminals, the two signal terminals being arranged on inner surfaces of a recessed portion of an electrical device.

* * * * *